(12) United States Patent
Chien

(10) Patent No.: US 7,349,165 B2
(45) Date of Patent: Mar. 25, 2008

(54) CLAMPING APPARATUS FOR CLAMPING OPTICAL ELEMENT

(75) Inventor: Yang-Chang Chien, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/474,169

(22) Filed: Jun. 23, 2006

(65) Prior Publication Data

US 2007/0127143 A1 Jun. 7, 2007

(30) Foreign Application Priority Data

Dec. 7, 2005 (CN) .................. 2005 1 0102303

(51) Int. Cl.
*G02B 13/14* (2006.01)
(52) U.S. Cl. .................... 359/821; 359/822
(58) Field of Classification Search ............ 359/811, 359/808, 813, 818, 819, 619, 198, 815, 809; 414/24, 332

See application file for complete search history.

(56) References Cited

U.S. PATENT DOCUMENTS

| 4,482,228 | A | * | 11/1984 | Fujita ........................ 396/73 |
| 5,737,131 | A | * | 4/1998 | Palmer ........................ 359/819 |
| 6,388,824 | B1 | * | 5/2002 | Treichler et al. ............ 359/819 |
| 6,477,333 | B1 | * | 11/2002 | Manabe et al. ............. 396/380 |
| 6,728,048 | B2 | * | 4/2004 | Takase ........................ 359/819 |
| 2004/0094184 | A1 | * | 5/2004 | Muster et al. ................ 134/19 |
| 2006/0139759 | A1 | * | 6/2006 | Hashimoto et al. ......... 359/619 |
| 2006/0181773 | A1 | * | 8/2006 | Yen ............................. 359/565 |

* cited by examiner

*Primary Examiner*—Ricky Mack
*Assistant Examiner*—Vipin M Patel
(74) *Attorney, Agent, or Firm*—Jeffrey T. Knapp

(57) ABSTRACT

A clamping apparatus for clamping optical elements (100) includes a first fixture (10), a second fixture (20) and two mounting members (30). The first fixture defines a plurality of holding holes (11). The second fixture defines a plurality of holding grooves (210) corresponding to the holding holes. The holding grooves and holding holes are configured for cooperatively positioning the optical elements. At least one mounting member is configured for adjustably mounting the first fixture and the second fixture so that the first fixture and the second fixture are movable so as to position the optical elements in different positions.

20 Claims, 5 Drawing Sheets

CLAMPING APPARATUS FOR CLAMPING OPTICAL ELEMENT

TECHNICAL FIELD

The present invention relates generally to clamping apparatuses and, in particular, to a clamping apparatus for clamping optical elements such as lenses.

BACKGROUND

Nowadays, optical elements such as lenses are commonly used in digital cameras or digital video recorders. There is more and more demand for higher quality and serviceability of these optical elements. A film such as an anti reflective film or an infra-red cut film is generally applied onto the optical elements, especially on lenses. To improve imaging quality, it is an important first step to wash the optical elements before applying a film thereon. How to wash optical elements effectively before plating is therefore an important area of development.

Generally, optical elements are washed using ultrasonic waves in a vessel filled with liquid. However, the optical elements are prone to collide with each other during washing by the ultrasonic waves. As a result, a surface of each optical element can easily become scraped or damaged. Therefore, optical elements need to be fixed in a clamping apparatus so that the optical elements are separated from each other and do not collide with each other.

Referring to FIG. 8, a typical clamping apparatus is a holding board 40 defining a plurality of receiving holes 41. Each of the receiving holes 41 has a shape and size corresponding to one of optical elements (not shown). In use, each of the optical elements is received in one of the receiving holes 41, and the holding board 40 is then put in a liquid to be cleaned by concussion of ultrasonic waves. Because all the optical elements are received in the receiving holes 41, impurities on surfaces of the optical elements touching the holding board 4 are not easy to clean, thus, the washing effect is not good.

Therefore, a new clamping apparatus for clamping optical elements is desired in order to overcome the above-described shortcomings.

SUMMARY OF THE INVENTION

In one aspect, a clamping apparatus for clamping optical elements includes a first fixture, a second fixture and two mounting members. The first fixture defines a plurality of holding holes. The second fixture defines a plurality of holding grooves corresponding to the holding holes. The holding grooves and holding holes are configured for cooperatively positioning the optical elements. At least one mounting member is configured for adjustably mounting the first fixture and the second fixture so that the first fixture and the second fixture are movable so as to position the optical elements in different positions.

In another aspect, a method for washing optical elements is included, comprising the following steps: providing a clamping apparatus for clamping optical elements, including a first fixture defining a plurality of holding holes, a second fixture defining a plurality of holding grooves corresponding to the holding holes, and at least one mounting member, the first fixture and the second fixture being movably attached to the mounting member; adjusting the first fixture so that the holding holes of the first fixture face the holding grooves of the second fixture; positioning the optical elements between the holding holes and the holding grooves; fixing the second fixture to the two mounting member; immersing the clamping apparatus with the optical element into a clean liquid for washing; adjusting the first fixture together with the optical elements so as to position the optical elements in different positions for effectively washing; taking the clamping apparatus out of the liquid after washing is finished; releasing the optical elements from the clamping apparatus.

Other advantages and novel features will become more apparent from the following detailed description, when taken in conjunction with the accompanying drawings.

BRIEF DESCRIPTION OF THE DRAWINGS

Many aspects of the clamping apparatus can be better understood with reference to the following drawings. The components in the drawings are not necessarily drawn to scale, the emphasis instead being placed upon clearly illustrating the principles of the clamping apparatus. Moreover, in the drawings, like reference numerals designate corresponding parts throughout the several views.

DETAILED DESCRIPTION OF THE EMBODIMENTS

Figure 1:
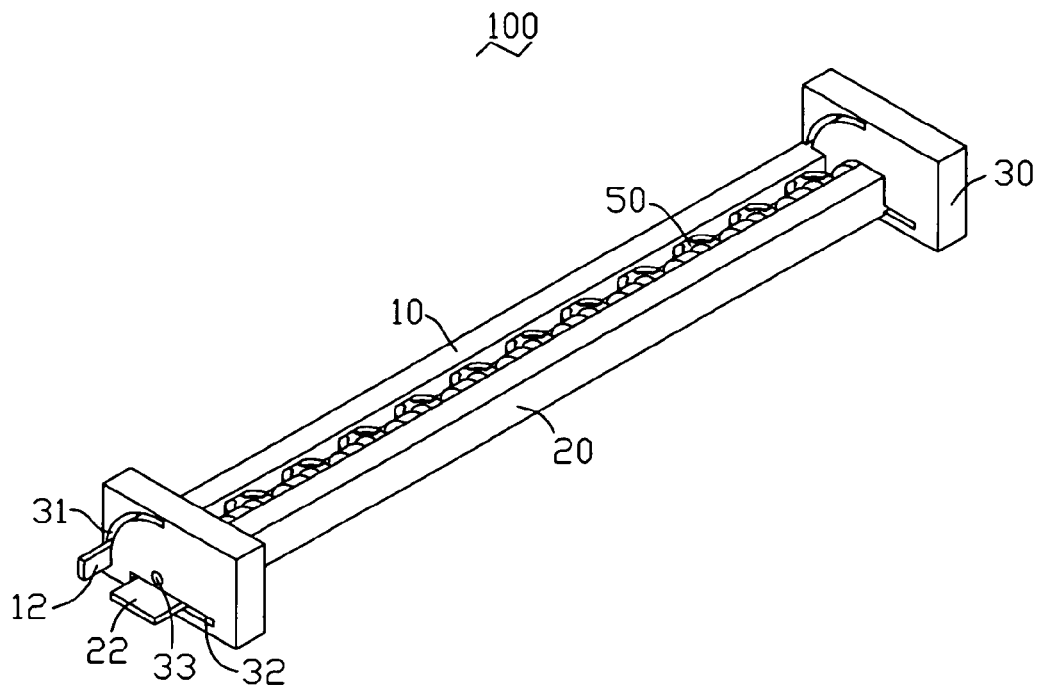
FIG. 1 is an isometric view of the clamping apparatus, in accordance with a first embodiment.

Referring now to the drawings in detail, FIG. 1 shows a clamping apparatus 100 for clamping optical elements such as lenses. In a first embodiment, the optical elements are lenses 50. The clamping apparatus 100 includes a first fixture 10, a second fixture 20, and two mounting members 30. The first fixture 10 and the second fixture 20 are both attached to the two mounting members 30 so as to clamp a plurality of lenses 50 in an adjustable manner.

Figure 2:
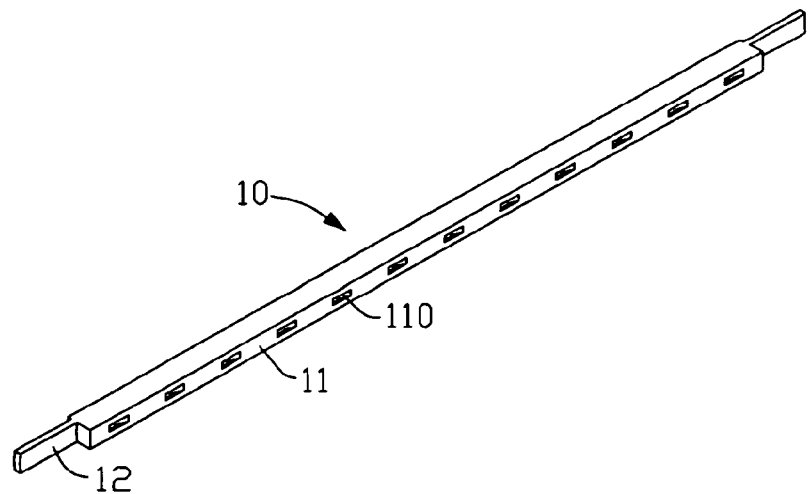
FIG. 2 is an isometric view of a first fixture shown in FIG. 1.

Referring together to FIG. 2, the first fixture 10 is an elongated bar with a substantially rectangular cross section, including a holding surface 11 and two sliding portions 12. The first fixture 10 has a plurality of holding holes 110 evenly defined in the holding surface 11, and each of the holding holes 110 has a shape corresponding to one of the lenses 50. A fringe portion (not labeled) of each lens 50 can be partly received in one of the holding holes 110. One of the sliding portions 12 extends from one end of the first fixture 10, and the other extends from an opposite end of the first fixture 10.

Figure 3:
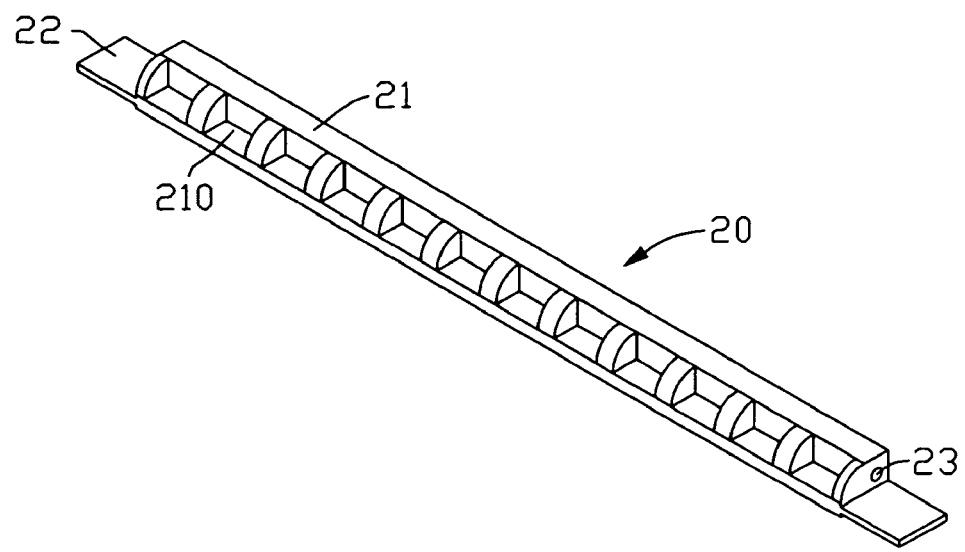
FIG. 3 is an isometric view of the second fixture shown in FIG. 1.

Referring together to FIG. 3, the second fixture 20 includes a bar portion 21 and two extending portions 22. The bar portion 21 evenly defines a plurality of holding grooves 210 corresponding to plurality of holding holes 110 of the first fixture 10. The bar portion 21 has two end walls (not labeled) and each of the end walls defines a mounting hole 23, and the mounting hole 23 is a screw thread hole. Each of the extending portions 22 is substantially rectangular in shape. One of the extending portions 22 extends from one end of the bar portion 21, and the other extends from an opposite end of the bar portion 21.

The mounting members 30 are substantially rectangular in shape. Each of the mounting members 30 defines a guiding groove 31, a sliding groove 32, and a fixing hole 33. The guiding groove 31 is arc-shaped and is defined in a corner of the mounting member 30. The sliding groove 32 is a rectangular groove defined in an end portion of the mounting member 30. The fixing hole 33 is a screw thread hole defined adjacent to the sliding groove 32.

In assembly, one of the sliding portions 12 of the first fixture 10 is movably received in the guiding groove 31 of one of the mounting members 30 and is thus slideable along the arc-shaped path defined by a given guiding groove 31. One of the extending portions 22 of the second fixture 20 is received in the sliding groove 32 of one of the mounting members 30, being limited to a linear slide path therein due to the rectangular shape of a given sliding groove 32. The other one of the sliding portions 12 of the first fixture 10 is movably received in the guiding groove 31 of the other one of the mounting members 30. The other one of the extending portions 22 of the second fixture 20 is received in the sliding groove 32 of the other one of the mounting members 30. The extending portions 22 of the second fixture 20 are moved to one end of the sliding groove 32, and each of the fixing holes 33 in the mounting members 30 is aimed at each of the mounting holes 23 in the second fixture 20 at such a position. By using two bolts (not shown) engaging in the mounting holes 23 and the fixing holes 33, the second fixture 20 is fixed to the mounting members 30. After assembly, the mounting members 30 are parallel to each other, and the first fixture 10 and the second fixture 20 can be adjusted between the two mounting members 30.

Figure 4:
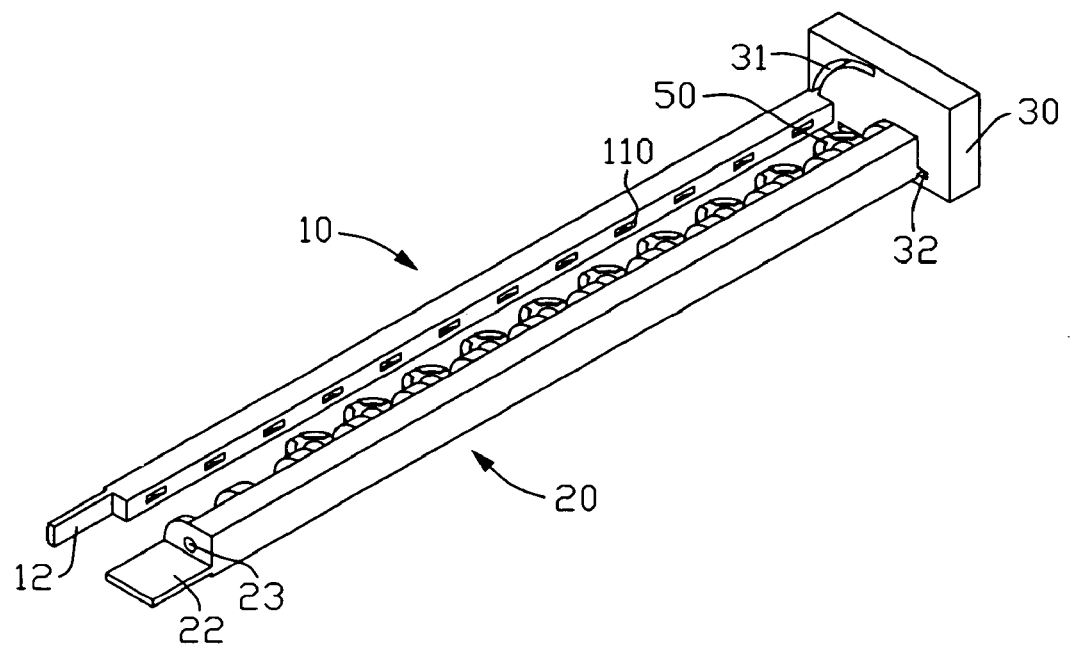
FIG. 4 is a partly assembled, isometric view of the clamping apparatus shown in FIG. 1.
Figure 5:
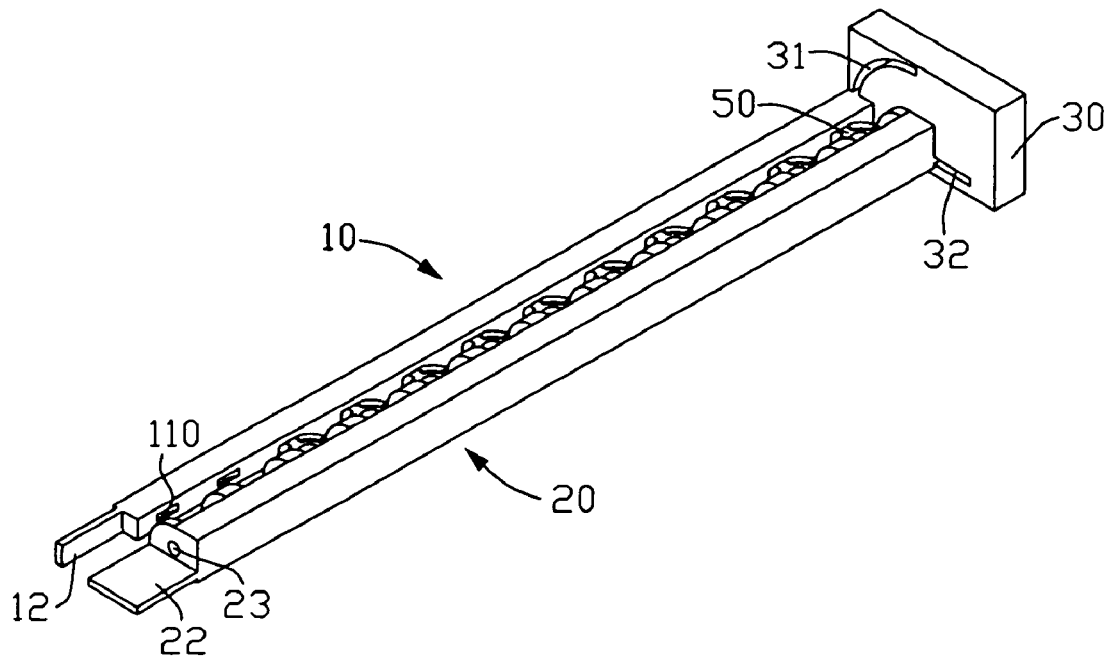
FIG. 5 is similar to FIG. 4, but showing a second state.
Figure 6:
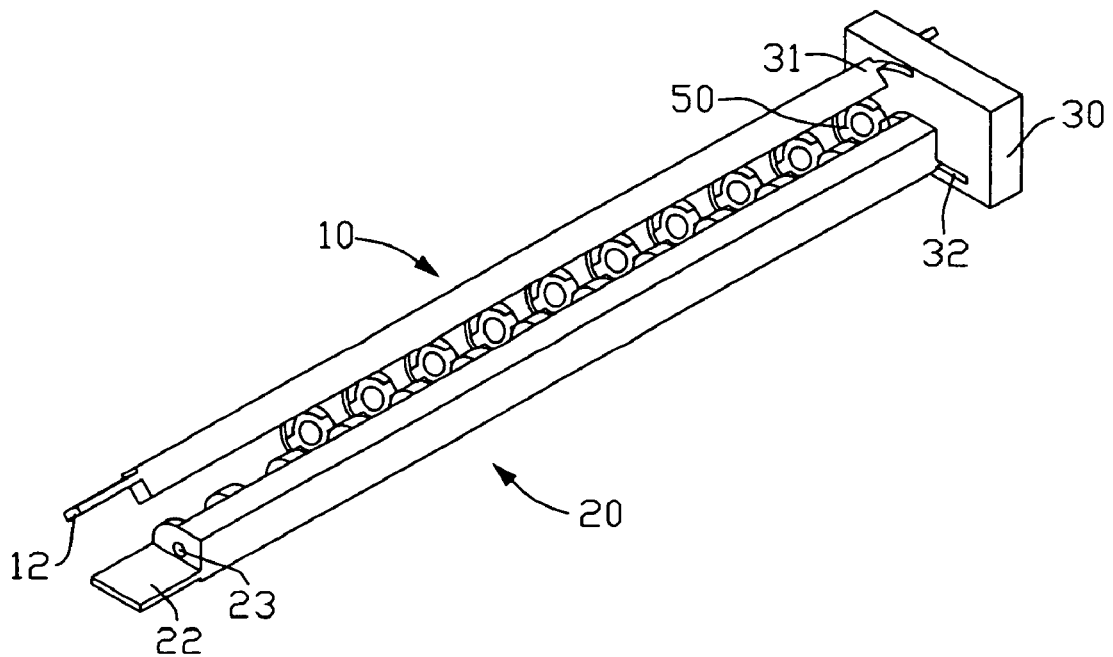
FIG. 6 is similar to FIG. 4, but showing a third state.

Referring together to FIGS. 4-6, the clamping apparatus 100 is used in a method to clean lenses 50. The method for washing lenses 50 includes the following steps. The first fixture 10 is adjusted so that the sliding portions 12 of first fixture 10 are moved to one end of the guiding groove 31, and the holding holes 110 of the first fixture 10 face the holding grooves 210 of the second fixture 20. The lenses 50 are put into the holding grooves 210, and each of the lenses 50 is partly received in each of the holding grooves 210. The second fixture 20 is moved along the sliding groove 32 towards the first fixture 10 so that each of the lenses 50 is also partly received in each of the holding holes 11, then the lenses 50 are fixed between the first fixture 10 and the second fixture 20. By using two bolts engaging in the mounting holes 23 and the fixing holes 33, the second fixture 20 is fixed to the mounting members 30 for stopping the lenses 50 from falling off the clamping apparatus 100. Now, as seen from FIGS. 4-6, an extending direction of the first fixture 10 is substantially parallel to an extending direction of the second fixture 20 each lens 50 extends, from a first fringe edge to a second fringe edge, between the first fixture 10 and the second fixture 20. The clamping apparatus 100 with the lenses 50 are immersed into a washing liquid for washing. The first fixture 10 is moved together with the lenses 50 along the guiding grooves 31 of the mounting members 30, and a first fringe/edge portion of each optical element held by the first fixture 10 is correspondingly arcuately moved, as per the arc-shape path defined by the guiding grooves 31, relative to a second opposite fringe/edge portion of the optical element held by the second fixture 12. Thus, the position of the lenses 50 is adjustable according to different requirements, and the lenses 50 are effectively cleaned. The clamping apparatus 100 is then taken out of the liquid. The first fixture 10 is adjusted so that the holding holes 110 of the first fixture 10 again face the holding grooves 210 of the second fixture 20. The second fixture 12 is disengaged from the mounting members 30 by disassembling the two bolts from the mounting holes 23 and the fixing hole 33. The second fixture 12 is moved linearly along each sliding groove 32 to one end thereof for taking out the lenses 50 from the clamping apparatus 100.

Figure 7:
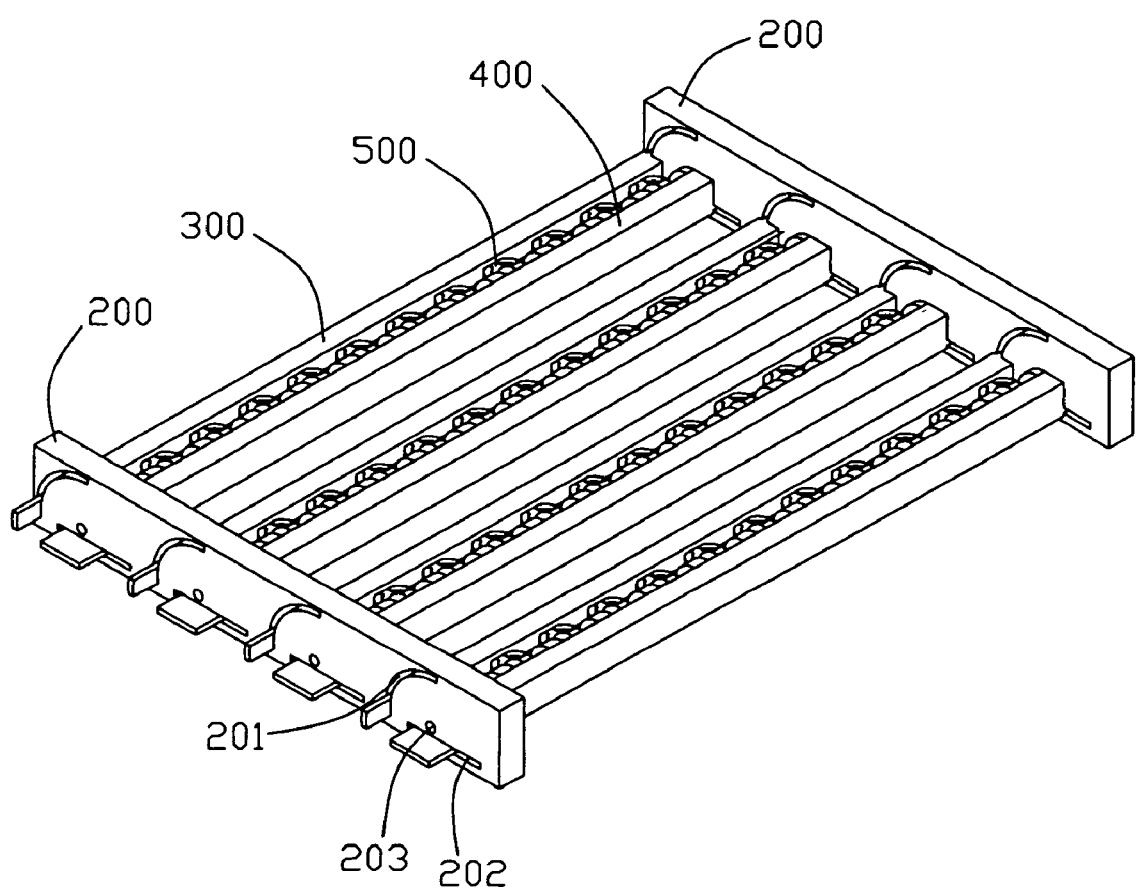
FIG. 7 is an isometric view of the clamping apparatus, in accordance with a second embodiment.
Figure 8:
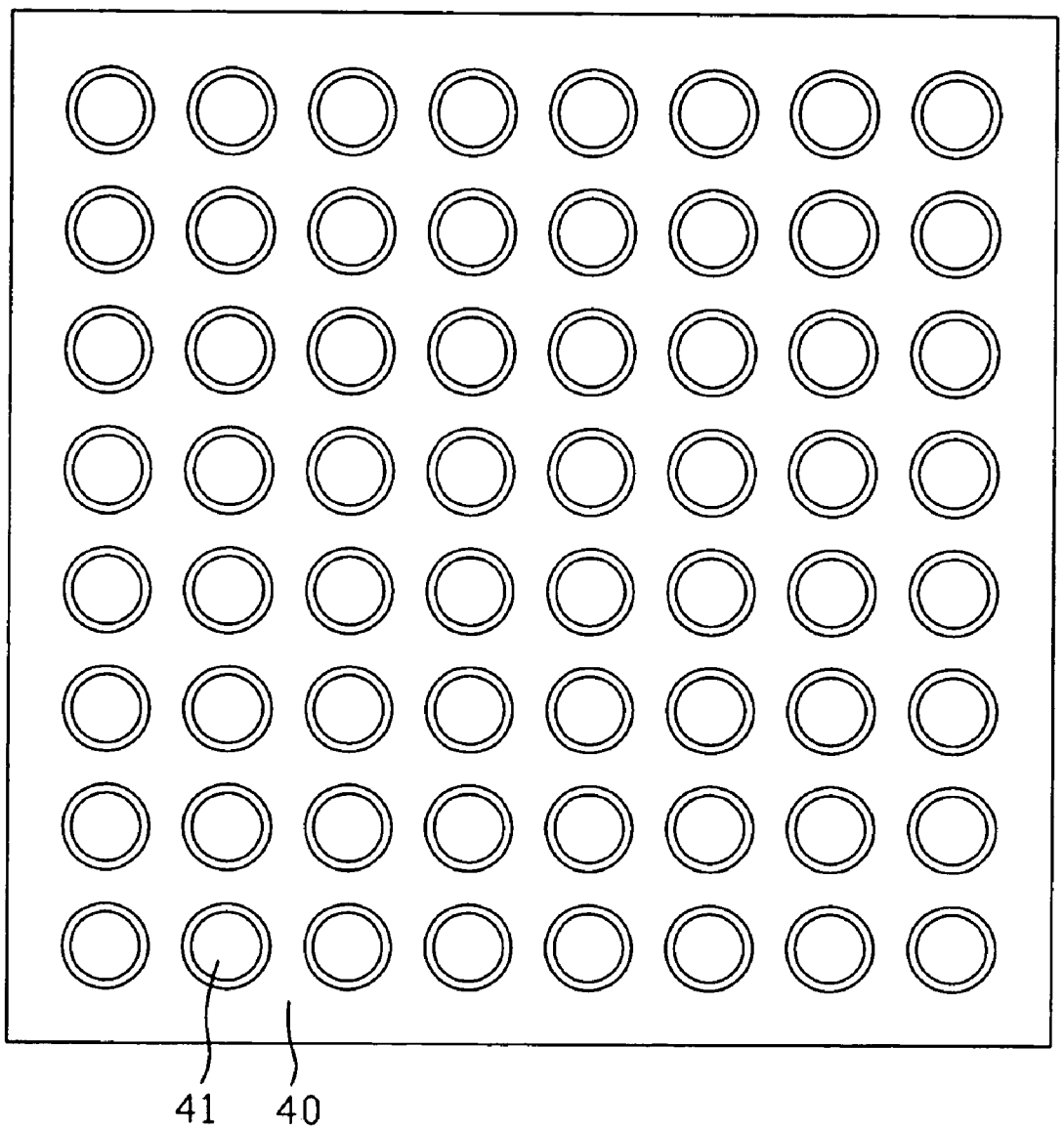
FIG. 8 is an isometric view of a typical clamping apparatus.

In a second embodiment, referring together to FIG. 7, two mounting members 200 each define a plurality of guiding grooves 201, a plurality of sliding grooves 202 and a plurality of fixing holes 203. Therefore, each of the mounting members 200 are able to mount a plurality of first fixtures 300 and a plurality of second fixtures 400 so that the efficiency for washing lenses 500 is further improved.

It is to be understood, the clamping apparatus can only have one mounting member or a plurality of mounting members.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clamping apparatus for clamping optical elements, comprising:
   a first fixture defining a plurality of holding holes;
   a second fixture defining a plurality of holding grooves corresponding to the holding holes, the holding grooves and holding holes being configured for cooperatively positioning the optical elements; and
   at least one mounting member adjustably mounting the first fixture and the second fixture so that the first fixture and the second fixture are movable so as to allow a first fringe portion of each optical element held by the first fixture to arcuately move relative to a second opposite fringe portion of the optical element held by the second fixture.

2. The clamping apparatus as claimed in claim 1, wherein the first fixture includes a holding surface, the holding holes are evenly defined in the holding surface, and each of the holding boles has a shape corresponding to each of the optical elements.

3. The clamping apparatus as claimed in claim 1, wherein the number of the mounting members is two, the first fixture has two sliding portions extending from two ends of the first fixture, the mounting members each defines a guiding groove, and each of the sliding portions is movably received in the guiding groove of one of the mounting members.

4. The clamping apparatus as claimed in claim 3, wherein the guiding groove is arched in shape and defined in a corner of the corresponding mounting member.

5. The clamping apparatus as claimed in claim 4, wherein the second fixture includes a bar portion evenly defining the holding grooves.

6. The clamping apparatus as claimed in claim 5, wherein the second fixture includes two extending portions extending from two ends of the bar potion, and each of the mounting members defines a sliding groove for receiving each of the extending portions.

7. The clamping apparatus as claimed in claim 6, wherein each of the extending portions is substantially rectangular in shape and the sliding groove is defined in an end portion of the mounting member.

8. The clamping apparatus as claimed in claim 6, wherein the second fixture has two end walls and each of the end walls defines a mounting hole, and the mounting member has a fixing hole defined adjacent to the sliding groove corresponding to the mounting hole.

9. The clamping apparatus as claimed in claim 8, wherein the fixing hole and the mounting hole are both screw thread holes.

10. A clamping apparatus for optical elements, comprising:
- at least one first fixture each defining a plurality of first holding portions;
- at least one second fixture each defining a plurality of second holding portions corresponding to first holding portions, the first holding portions and the second holding portions being configured for cooperatively positioning the optical elements; and
- at least one mounting member mounting the first and second fixtures so that the first fixture and the second fixture are movable relative to each other so as to position the optical elements in different positions, each mounting member being configured such that the first fixture is arcuately slideable relative thereto and such that the second fixture is linearly slideable relative thereto.

11. The clamping apparatus as claimed in claim 10, wherein the clamping apparatus includes a plurality of such first fixtures, a plurality of such second fixtures, and two such mounting members, the first and second fixtures being attached between the mounting members.

12. The clamping apparatus as claimed in claim 11, wherein the first fixtures are parallel to each other, and the second fixtures are parallel to each other.

13. The clamping apparatus as claimed in claim 10, wherein the at least one mounting member defines two grooves, the at least one first fixture has a first sliding portion extending from one end thereof and is slideably received in one of the grooves, the at least one second fixture has a second sliding portion extending from one end thereof and is slideably received in the other of the grooves.

14. The clamping apparatus as claimed in claim 13, wherein the one of the grooves is configured to allow the at least one first fixture to slide along a curved path, and the other of the grooves is configured to allow the at least one second fixture to slide linearly.

15. The clamping apparatus as claimed in claim 14, wherein the one of the grooves is arched in shape, and the other of the grooves is rectangular in shape.

16. A method for washing optical elements, comprising the following steps:
- providing a clamping apparatus for clamping optical elements, including a first fixture defining a plurality of first holding portions, a second fixture defining a plurality of second holding portions corresponding to the first holding portions, and at least one mounting member, the first fixture and the second fixture being movably attached to the mounting member;
- adjusting the first fixture so that the first holding portions of the first fixture align with the second holding portions of the second fixture;
- positioning the optical elements between the first holding portions and the second holding portions;
- fixing the second fixture to the at least one mounting member;
- immersing the clamping apparatus with the optical elements into a clean liquid for washing;
- adjusting the first fixture together with the optical elements so as to allow a first fringe portion of each optical element held by the first fixture to arcuately move relative to a second opposite fringe portion of the optical element held by the second fixture for effectively washing;
- taking the clamping apparatus out of the liquid after washing is finished; and
- releasing the optical elements from the clamping apparatus.

17. The method for washing optical elements as claimed in claim 16, wherein the first fixture includes a holding wall, the holding portions are evenly defined in the holding wall, and each of the holding portions has a shape corresponding to the optical element being held.

18. The method for washing optical elements as claimed in claim 16, wherein the first fixture has a sliding portion extending from one end of the first fixture, the mounting member has a guiding groove slideably receiving the sliding portion of the first fixture.

19. The method for washing optical elements as claimed in claim 18, wherein the guiding groove is arc-shaped and defined in a corner of the mounting member.

20. The method for washing optical elements as claimed in claim 16, wherein adjusting the first fixture comprises sliding the first fixture along a curved path.

* * * * *